United States Patent [19]
Carlson

[11] 3,736,859
[45] June 5, 1973

[54] COOKING IRON

[76] Inventor: Arnold August Carlson, 4350 Pilot Knob Road, Saint Paul, Minn. 55123

[22] Filed: June 10, 1971

[21] Appl. No.: 151,805

[52] U.S. Cl. .......................99/331, 99/352, 99/372
[51] Int. Cl. ...........................................A47j 37/04
[58] Field of Search......................99/372, 257, 331, 99/353, 373–381, 422, 428, 107; 16/85, 142, 180, 190; 17/25, 28; 100/93; 219/19

[56] References Cited

UNITED STATES PATENTS

| | | | |
|---|---|---|---|
| 2,720,157 | 10/1955 | Harrison | 99/353 |
| 1,987,349 | 1/1935 | Rasmussen | 17/28 |
| 1,071,459 | 8/1913 | Perky | 99/379 |
| 2,770,182 | 11/1956 | Jensen | 99/373 |
| 3,611,476 | 10/1971 | Clifton | 17/25 |

FOREIGN PATENTS OR APPLICATIONS

| | | | |
|---|---|---|---|
| 926,031 | 3/1955 | Germany | 99/379 |

*Primary Examiner*—Billy J. Wilhite
*Assistant Examiner*—Arthur O. Henderson
*Attorney*—James R. Haller

[57] ABSTRACT

A cooking iron which includes opposed upper and lower platens each having a surface bearing a plurality of outwardly extending, food-piercing metal needles, and a pair of removable perforated stripper plates adapted to lie against the upper and lower platens, the needles of said platens protruding through the perforations in the stripper plates. The cooking iron may also include pressural means for urging the platens into facing, closed relationship and spring loaded hinge means for connecting said upper and lower platens.

10 Claims, 5 Drawing Figures

PATENTED JUN 5 1973

INVENTOR
ARNOLD AUGUST CARLSON
BY James R. Haller
ATTORNEY

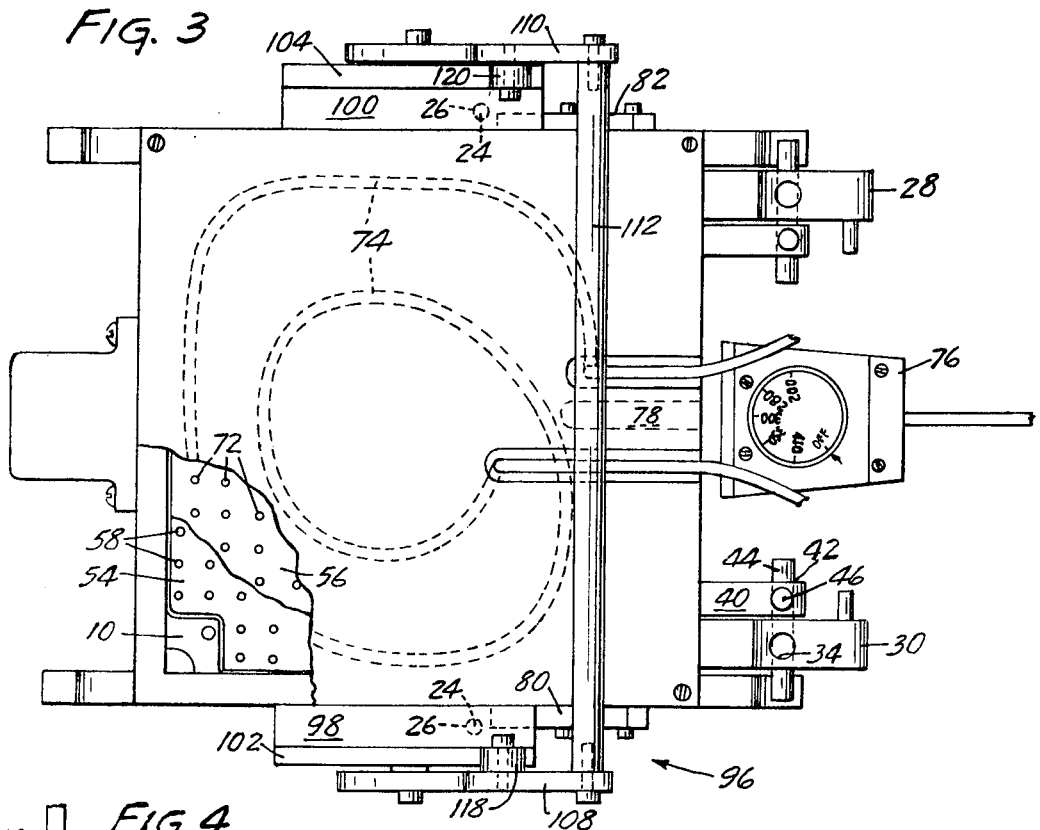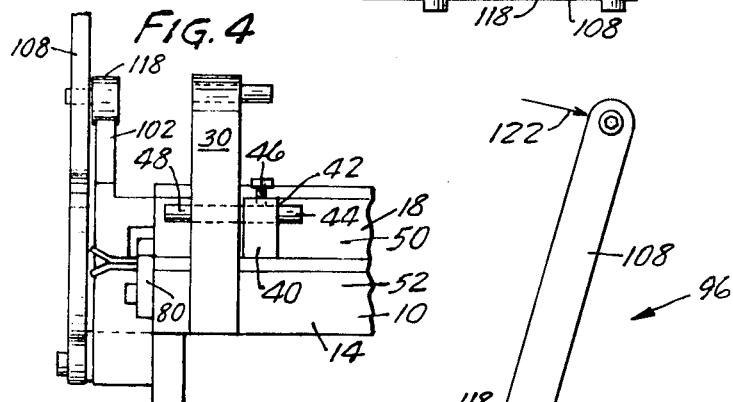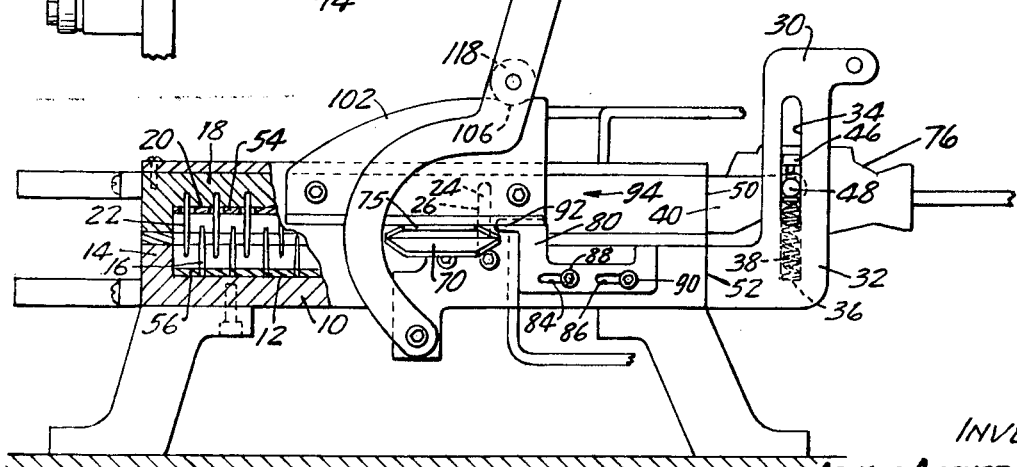

COOKING IRON

This invention relates to utensils for the preparation of food and more particularly to utensils of the waffle-iron type wherein food is prepared internally of and in contact with the utensil.

Cooking utensils operating on the general principle of the waffle-iron have long been desired for cooking steaks and other foods. Rather than use the truncated projections found in normal waffle-irons, it would be highly desirable to utilize spikes or needles which would actually pierce the food to be cooked, thereby tenderizing the food and also permitting the food to be cooked in a more rapid and economical manner. Several embodiments of this basic idea have been proposed throughout the years. U.S. Pat. No. 267,535 (Hurd) discloses a meat broiler consisting of a pair of cast iron dishes hinged together. The inner surface of the dishes were provided with pyramidal teeth, the teeth of one dish being offset from the teeth of the other dish. In use, a slice of meat was placed between the dishes and the dishes were pressed together, thereby forcing the pyramidal teeth into the meat. Heating of the closed apparatus was said to cook the meat but to permit retention of the natural juices. U.S. Pat. No. 1,790,194 (Amacher) disclosed a similar meat iron which was heated with electricity. U.S. Pat. No. 1,915,962 (Vaughn) described another meat iron, heated with electricity. The Vaughn iron utilized hollow, spring loaded spikes rather than pyramidal teeth so that when the iron was closed on a portion of meat which included a bone, those spikes contacting the bone were to be pressed up against spring action into the lid of the apparatus, thereby permitting the iron to close fully.

The steak iron type of cooking utensils of the prior art have suffered from several serious drawbacks. Firstly, the amount of force or pressure required to drive a plurality of pyramidal shaped teeth or spikes into various foods such as beef steak is surprisingly large, and easily may be beyond the strength of the ordinary housewife. Secondly, it is often extremely difficult to remove cooked food from the teeth or spikes of such steak irons. A steak or other food cooked in such steak irons may be badly mutilated when the steak irons are opened due to adherence of the steak to the pyramidal teeth of such devices. This is especially serious when rapid, repeated use must be made of such utensils without intermediate washing or other cleaning. Thirdly, the number of teeth which have been used in such utensils have been insufficient to decrease cooking time.

It is thus an object of the present invention to provide a cooking iron having food-piercing teeth which may be pushed with ease through even tough meats.

It is another object of the invention to provide a cooking iron which permits food to be removed therefrom readily and without undue tearing even after repeated use without washing.

It is yet another object of the invention to provide a cooking iron which will permit food to be cooked in far less time than would ordinarily be required by common cooking techniques.

Briefly, the present invention relates to a cooking iron which comprises the following elements in combination:

a. A lower platen having a flat, upper surface bearing a plurality of upwardly extending, food-piercing metal needles.

b. An upper platen adapted to be centered above and aligned with the lower platen, the upper platen having a flat, lower surface bearing a plurality of downwardly extending, food-piercing metal needles positioned to fit between the upwardly extending needles of the lower platen.

c. Alignment means for positioning the upper and lower platens in facing relationship.

d. Pressural means for urging the platens into facing, closed relationship.

e. Lower and upper metal stripper plates, each having a plurality of perforations corresponding in position and in size respectively to the needles of the lower and upper platens. The lower and upper stripper plates are adapted to removably lie in facing engagement with the upper and lower surfaces of the platens such that the needles borne by these surfaces protrude through the perforations.

Cooking is accomplished while the stripper plates are in the noted position. After cooking has been completed, the platens are separated and the stripper plates are removed, the cooked food being retained between the stripper plates rather than remaining impaled upon the needles of the upper and lower platens.

The present invention may be more easily understood by reference to the accompanying drawing wherein:

FIG. 3 is a top view of the cooking iron of the invention, shown partially broken away;

FIG. 4 is a fragmentary enlarged view of a hinge element of the invention; and

FIG. 5 is a side view of the cooking iron of the invention shown partially broken away and in partial cross section.

Figure 1:
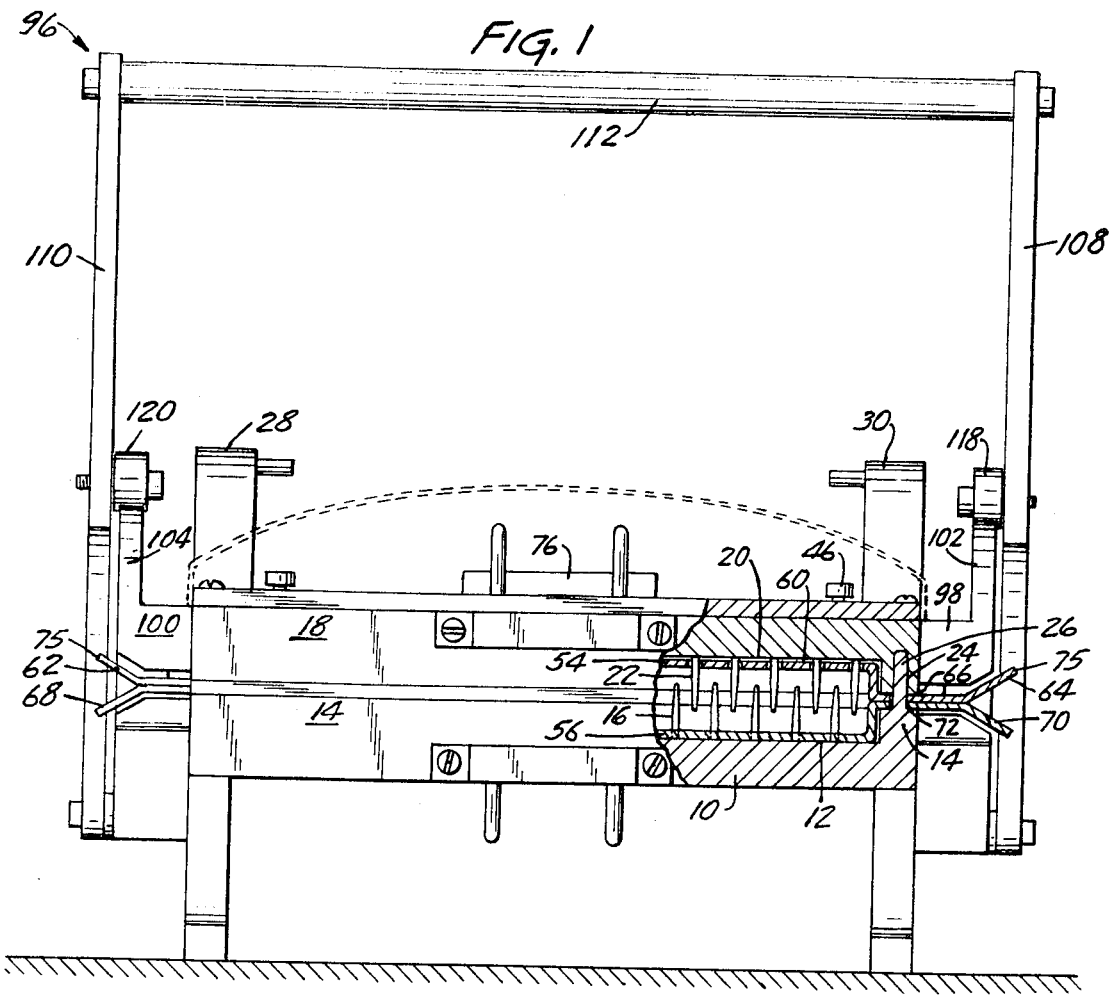
FIG. 1 is a front view of the cooking iron of the invention, shown partially broken away and in cross section.

Referring now to FIG. 1, a lower platen 10 is provided which has a substantially flat, upper surface 12. The surface 12 is preferably depressed from the periphery 14 of the platen so that the platen will retain meat juices and the like during the cooking operation. The upper surface 12 bears a plurality of upwardly extending, food-piercing metal needles exemplified as 16. An upper platen 18 of the same general size and configuration as lower platen 10 is provided with a substantially flat, lower surface 20 which bears a plurality of downwardly-extending, food-piercing metal needles 22. The upper platen 18 is adapted to be centered above and aligned with the lower platen 10, downwardly extending needles 22 being positioned to fit between upwardly extending needles 16 of the lower platen.

The needles of the upper and lower platens are preferably arranged in evenly spaced horizontal and vertical rows, the rows of the top platen being offset by one-half of a row both horizontally and vertically from the rows of the bottom platen. Thus, when the upper platen is closed upon the bottom platen, each needle of the bottom platen will be equidistantly spaced horizontally from at least three of the nearest adjacent needles of the top platen.

The upper and lower platens are positioned in facing relationship by alignment means, exemplified in FIG. 5 as pin 24 and socket 26, the pin 24 as illustrated arising from the periphery of bottom platen and the socket 26 being provided in the periphery upper platen such that entry of the pin into the socket assures proper alignment of the upper and lower platens. A second pin and socket arrangement (not shown) is provided elsewhere on the periphery of the platens, thereby providing positive horizontal alignment control between upper and lower platens.

The so-described alignment means may additionally include hinge means depicted in FIG. 3 as identical hinges 28 and 30. Referring to FIG. 5, the hinge 30 comprises a bottom portion 32 which is rigidly connected to and extends rearward of the lower platen 10, and which contains a vertical slot 34 having a closed lower end 36, which slot slidingly encloses helical spring 38. Upper hinge element 40, which is rigidly connected to and extends rearwardly of upper platen 18, is provided with transverse hole 42 releasably carrying pin 44 by means of set screw 46, one end 48 of pin 44 extending through slot 34 in the bottom portion of the hinge so as to ride upon helical spring 38. Respective adjacent rearward edges 50 and 52 of upper and lower platens 18 and 10 are thus connected by the hinge means represented by hinges 28 and 30, and spring means, represented by the helical spring, normally urges apart adjacent edges 50 and 52 of the platens.

Referring again to FIG. 1, the upper and lower platens 18 and 10 respectively are provided with stripper plates 54 and 56 which removably lie in facing engagement with surfaces 20 and 12 of the platens respectively. The upper and lower stripper plates 54 and 56 are similar in appearance and function, each having a plurality of perforations therethrough which correspond in position and diameter to the needles which project respectively from the upper and lower platen surfaces.

Figure 2:
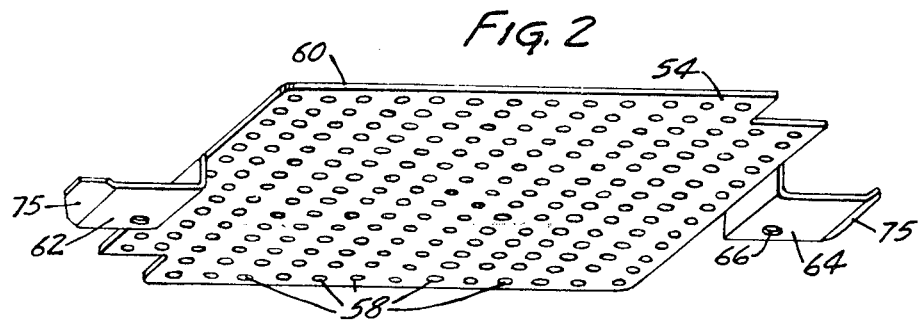
FIG. 2 is a perspective view of a stripper plate utilized in the present invention.

Referring now to FIG. 2 (which is an enlarged view of upper stripper plate 54), the perforations are preferably arranged in horizontal and vertical rows corresponding with the horizontal and vertical rows of food-piercing needles which extend downwardly from the lower surface 20 of the upper platen 18. The perforations (exemplified as 58) are slightly larger in size than the respective downwardly extending needles at the juncture of these needles with the lower surface 20. The upper surface 60 of the stripper plate 54 may thus be contacted with lower surface 20 of the upper platen, the needles 22 protruding downwardly through the respectively aligned perforations 58 of the stripper plate. The stripper plate 54 is also provided with handles 62 and 64 which are depressed slightly from the plane of the stripper plate. The handles may be provided with holes therethrough (exemplified as 66) adapted to accommodate alignment pin 24, thereby providing prearranged alignment between the stripper plate 54 and the downwardly extending needles of the upper platen 18. As will be understood from FIG. 1, lower stripper plate 56 is of the same general configuration as the upper stripper plate 54, the perforations in the lower stripper plate similarly corresponding in position and size to the needles rising upwardly from the lower platen. Lower stripper plate 56 similarly is provided with handles 68 and 70 which are slightly elevated from the plane of the lower stripper plate and which similarly may have holes (exemplified as 72) to accommodate the alignment pin 24. As noted above, the handles 62, 64, 68 and 70 may deviate from the plane of the upper and lower stripper plates, and it is preferred that this deviation be such as to place these handles in contiguous relationship (as shown in FIG. 1) when the upper and lower platens are in facing, closed relationship so that each of the contiguous pairs of handles may be grasped by one hand. The ends of the stripper plate handles (exemplified as 75) may be slightly upturned to facilitate separation of one stripper plate from the other.

As heating means for heating the upper and lower platen surfaces and the food-piercing needles projecting therefrom, it has been found convenient to utilize electrical resistance heating elements of the type employed in electric stoves against the outer surfaces of the upper and lower platens. A configuration for a suitable heating element is shown at 74 in FIG. 3. Heating elements may as well be incorporated in the platens themselves, or various other heating means may be utilized. The heating elements will preferably be controlled by a controller of the type generally depicted as 76 in FIG. 3, the controller 76 being provided with a temperature sensing probe 78 which measures the temperature of the upper platen alone. The controller and probe are of the type commonly utilized to regulate temperature in kitchen appliances, the controller measuring the temperature of the upper platen and providing electrical energy to the heating coil 74 as is necessary to regulate the temperature of the upper platen to a preset value. It has surprisingly been found that only the temperature of the upper platen should be measured in controlling the temperatures of the upper and lower platens. It is believed that the juices from meat or other foods are collected in the lower platen during the cooking operation, and that a portion of the heat energy which is supplied to the lower platen is utilized in partially boiling away these juices, thereby preventing the lower platen from attaining a temperature much above the boiling point of such juices. It will be understood that if the temperature of the lower platen were utilized in controlling the temperature of both platens, an overabundance of heat energy would be supplied to the upper platen so that the food closest to the upper platen would be burned.

The platens and stripper plates are preferably made of highly heat conductive metals such as hardened aluminum or aluminum alloys, and desirably are substantially rectangular. The food-piercing needles are preferably round in cross section and are cast into the respective platens during the manufacture thereof, but may as well be affixed to the upper and lower platens by threaded joints, etc. The needles of each platen are of sufficient length so that when said platens are in facing closed relationship (during the cooking operation), the needles of each platen extend more than half of the distance separating the surface to which they are affixed to the surface of the opposing platen, but such that the needles do not touch the opposing surface, nor the facing surfaces of the stripper plates, as shown in FIGS. 1 and 3. The needles preferably are slightly tapered. Needles having a base diameter of one-eighth inch and tapered over a length of five-eighths inch to a point radius of one thirty-second inch have given good results. Needles preferably are employed at a density of from about 300 to about 425 (preferably 350-390) needles per 100 square inches of each platen.

The cooking iron of the invention is further preferably provided with locking means for locking the stripper plates to the bottom platen, as will be more fully discussed below. As depicted in FIG. 3, the cooking iron of the invention is provided with identical locking members 80 and 82. Locking member 80, as may be more clearly seen in FIG. 5, is provided with horizontal slots 84 and 86 by which member 80 is slidingly attached to lower platen 10 by means of pins 88 and 90. Member 80 is provided with a forwardly extending projection 92 which, when member 80 is pushed in the direction of arrow 94, slides over the handle 64 of the upper stripper plate 54, thus locking this stripper plate, and the stripper plate 56 therebeneath, in contact with the lower platen 10.

Pressural means, identified generally as 96, is employed to force the upper and lower platens into closed, facing relationship thereby causing the upwardly and downwardly projecting needles to pierce food carried between the platens within the stripper plates. As shown in FIGS. 3 and 5, a pair of spaced, parallel camming members 98 and 100 are mounted on opposing sides of the upper platen, the camming members respectively having arcuate, upper camming surfaces 102 and 104. A small notch is provided in the uppermost surface of each camming surface, the notch in camming surface 102 being shown as 106 in FIG. 5. A cam follower is also provided, the cam follower including two substantially parallel legs 108 and 110, and a cross bar 112 (which acts as a manually operable handle) connecting the two legs at one end thereof, the free ends 114 and 116 of the legs 108 and 110 being pivotally connected to the bottom platen 10 at opposing sides thereof. Legs 108 and 110 have at points along their length projections (shown respectively as cam rollers 118 and 120) which are respectively adapted to engage arcuate camming surfaces 104 and 102 such that movement of the cam follower in the direction indicated by arrow 122 causes the upper platen 18 to be cammed downwardly into facing, closed relationship with the bottom platen 10.

In operation, meat or other food is placed between the stripper plates, and the resulting assembly is aligned atop the lower platen, the upwardly extending needles thereof just penetrating the perforations in the lower stripper plate and the alignment pins (e.g., 24) penetrating the holes in the stripper plate handles. The upper platen is then lowered into facing engagement with the stripper plates, the downwardly extending needles of the upper platen just penetrating the perforations in the upper stripper plate. The upper platen is then urged into facing closed relationship with the lower platen, e.g., as by movement of the cam follower in the direction of arrow 122 in FIG. 5, the upwardly and downwardly extending needles thereby piercing the food carried between the stripper plates. Heat is applied to the upper and lower platens, and the food is cooked. Due to the presence of the needles, the area available for heat transfer is greatly increased, and cooking occurs very rapidly. A small amount of steam may be seen to rise from the lower platen during the cooking operation. After cooking has been completed, the upper and lower stripper plates are locked to the lower platen by the above-described locking means and the force pressing the upper and lower platens together is released by swinging the cam follower shown in FIG. 5 in a direction opposite to that of arrow 122. The upper platen is then lifted, and the needles which project downwardly from the upper platen are thus cleanly retracted through the holes in the upper stripper plate, the cooked food remaining between the stripper plates. Thereafter, the stripper plates are unlocked from the lower platen, and the stripper plates together are lifted upwardly to remove the cooked food from the upwardly extending needles of the lower platen. The stripper plates may then be separated, exposing the cooked food. In order to prevent even the possibility of cooked food adhering to the needles, it is desirable that the needles be washed after several uses, or that the needles be provided with an anti-stick treatment such as cooking oil, or treatment with one of the various fluorocarbon polymers such as Teflon as is commonly used as a coating for fry pans.

I claim:

1. Cooking iron comprising, in combination,
   a. a lower platen having a flat, upper surface bearing a plurality of upwardly extending, food-piercing metal needles;
   b. an upper platen adapted to be centered above and aligned with said lower platen, said upper platen having a flat, lower surface bearing a plurality of downwardly extending, food-piercing metal needles positioned to fit between the upwardly extending needles of said lower platen;
   c. alignment means for positioning said upper and lower platens in facing relationship;
   d. pressural means for urging said platens into facing, closed relationship;
   e. lower and upper metal stripper plates, each having a plurality of perforations corresponding in position and diameter respectively to the needles of said lower and upper platens so as to removably lie in facing engagement with said upper and lower surfaces, the needles of said surfaces protruding through said perforations, said stripper plates having handle portions extending outwardly therefrom such that when said platens are in facing, closed relationship, said handle portions are contiguous;
   f. heating means for electrically heating said upper and lower platen surfaces; and
   g. a temperature controller capable of sensing the temperature only of said upper platen and of regulating the temperature thereof.

2. Cooking iron comprising, in combination,
   a. a lower platen having a flat, upper surface bearing a plurality of upwardly extending, food-piercing metal needles;
   b. an upper platen adapted to be centered above and aligned with said lower platen, said upper platen having a flat, lower surface bearing a plurality of downwardly extending, food-piercing metal needles positioned to fit between the upwardly extending needles of said lower platen;
   c. alignment means for positioning said upper and lower platens in facing relationship;
   d. pressural means for urging said platens into facing, closed relationship; and
   e. lower and upper metal stripper plates, each having a plurality of perforations corresponding in position and diameter respectively to the needles of said lower and upper platens so as to removably lie in facing engagement with said upper and lower surfaces, the needles of said surfaces protruding through said perforations, said stripper plates having handle portions extending outwardly therefrom such that when said platens are in facing, closed relationship, said handle portions are contiguous.

3. The cooking iron of claim 2 additionally comprising lock means for locking said stripper plates to said bottom platen.

4. The cooking iron of claim 2 wherein said alignment means includes hinge means for connecting adjacent edges of said upper and lower platens.

5. The cooking iron of claim 2 wherein said hinge means includes spring means normally urging said adjacent edges apart.

6. The cooking iron according to claim 2 in which said pressural means include
 a. a pair of spaced, parallel camming members positioned on said upper platen, said members each having an arcuate, upper camming surface, and
 b. a cam follower including two legs and a cross bar connecting the legs at one end thereof, the free ends of said legs being pivotally connected to the bottom platen at opposing sides thereof, each leg having at a point along its length a projection adapted to engage one of said arcuate camming surfaces such that when said cam follower is operated, said upper platen is cammed downwardly into facing, closed relationship with said bottom platen.

7. The cooking iron of claim 2 including a temperature controller capable of sensing the temperature only of said upper platen and of regulating the temperature thereof.

8. Cooking iron comprising, in combination,
 a. lower platen having a flat upper surface bearing a plurality of upwardly extending, food-piercing metal needles;
 b. an upper platen adapted to be centered above and aligned with said lower platen, said upper platen having a flat, lower surface bearing a plurality of downwardly extending, food-piercing metal needles positioned to fit between the upwardly extending needles of said lower platen;
 c. spring loaded hinge means coupling adjacent edges of said lower and upper platens, said hinge means permitting and urging vertical separation of said adjacent edges and permitting pivotal displacement of said upper platen with respect to said lower platen;
 d. pressural means for urging said platens into facing closed relationship, said pressural means including arcuate camming means having a camming surface and rigidly attached to said upper platen and cam follower means pivotally coupled to said lower platen such that movement of said cam follower means over said camming surface urges said upper platen into facing, closed relationship with said lower platen; and
 e. lower and upper metal stripper plates, each stripper plate having a plurality of perforations therethrough corresponding in position respectively to the needles of said lower and upper platens, said perforations having a diameter slightly larger than the diameter of said respective needles at their juncture with said respective upper and lower surfaces, said lower and upper platens being adapted to removably lie in facing engagement with said upper and lower surfaces, the needles of said surfaces protruding through said perforations.

9. Cooking iron comprising, in combination,
 a. a lower platen having a flat, upper surface bearing a plurality of upwardly extending, food-piercing metal needles;
 b. an upper platen adapted to be centered above and aligned with said lower platen, said upper platen having a flat, lower surface bearing a plurality of downwardly extending, food-piercing metal needles positioned to fit between the upwardly extending needles of said lower platen;
 c. alignment means for positioning said upper and lower platens in facing relationship;
 d. pressural means for urging said platens into facing, closed relationship;
 e. lower and upper metal stripper plates, each having a plurality of perforations corresponding in position and diameter respectively to the needles of said lower and upper platens so as to removably lie in facing engagement with said upper and lower surfaces, the needles of said surfaces protruding through said perforations, said stripper plates having handle portions extending outwardly therefrom such that when said platens are in facing, closed relationship, said handle portions are contiguous; and
 f. lock means for locking said stripper plates to said bottom platen.

10. Cooking iron comprising, in combination,
 a. a lower platen having a flat, upper surface bearing a plurality of upwardly extending, food-piercing metal needles;
 b. an upper platen adapted to be centered above and aligned with said lower platen, said upper platen having a flat, lower surface bearing a plurality of downwardly extending, food-piercing metal needles positioned to fit between the upwardly extending needles of said lower platen;
 c. alignment means for positioning said upper and lower platens in facing relationship;
 d. pressural means for urging said platens into facing, closed relationship and comprising, on opposed platens, camming means including an arcuate camming surface and a cam follower adapted to engage said arcuate camming surface such that when said cam follower is operated, said upper platen is cammed downwardly into facing closed relationship with said bottom platen; and
 e. lower and upper metal stripper plates, each having a plurality of perforations corresponding in position and diameter respectively to the needles of said lower and upper platens so as to removably lie in facing engagement with said upper and lower surfaces, the needles of said surfaces protruding through said perforations, said stripper plates having handle portions extending outwardly therefrom such that when said platens are in facing, closed relationship, said handle portions are contiguous.

* * * * *